United States Patent
Haubold et al.

(10) Patent No.: US 7,305,178 B2
(45) Date of Patent: Dec. 4, 2007

(54) RESISTANCE HEATER

(75) Inventors: Thomas Haubold, Marbach (DE); Ralf Herrmann, Sachsenheim (DE)

(73) Assignee: Mann & Hummel GmbH, Ludwigsburg (DE)

( * ) Notice: Subject to any disclaimer, the term of this patent is extended or adjusted under 35 U.S.C. 154(b) by 220 days.

(21) Appl. No.: 11/270,660

(22) Filed: Nov. 10, 2005

(65) Prior Publication Data

US 2006/0098964 A1 May 11, 2006

(30) Foreign Application Priority Data

Nov. 11, 2004 (DE) .................. 10 2004 054 625

(51) Int. Cl.
*F24H 1/20* (2006.01)

(52) U.S. Cl. .................. 392/447; 392/441

(58) Field of Classification Search .............. None
See application file for complete search history.

(56) References Cited

U.S. PATENT DOCUMENTS 5,703,998 A * 12/1997 Eckman .................. 392/340

FOREIGN PATENT DOCUMENTS

DE      102 22 946 C1    10/2003

* cited by examiner

*Primary Examiner*—Thor S. Campbell
(74) *Attorney, Agent, or Firm*—Crowell & Moring LLP

(57) ABSTRACT

A resistance heater 10 for a liquid system, in particular a fuel system of a diesel engine, in which a heating element 13 is connected to at least two contact rods 12a, 12b. Terminals are provided on the contact rods 12a, 12b so that they can receive an electric voltage. In addition, a sensor 24 is provided with which at least one parameter in the liquid system can be detected, and the sensor 24 is connected accordingly to at least one analyzer unit 18.

11 Claims, 2 Drawing Sheets

RESISTANCE HEATER

BACKGROUND OF THE INVENTION

The present invention relates to a resistance heater for a liquid system, to a liquid system comprising a resistance heater according to the invention; to a method for detecting the liquid level in a liquid system according to the invention, and to a method for detecting the temperature of a liquid in a liquid system according to the invention.

Liquid systems exposed to free ambient conditions are under some circumstances subject to temperatures below the solidification point of the liquids used. This leads to the necessity to integrate heating elements into the liquid systems which are activated as a function of the liquid temperatures and ambient temperatures.

For example, German Patent DE 102 22 946 discloses a plastic resistance heater in which two side-by-side contact rods are connected to one another by a plastic resistance material. The contact rods are completely sheathed by the plastic resistance material in the zones inside the fuel system. One disadvantage of this resistance heater is that no sensor elements are provided to support the operation of the resistance heater. If the heater is to operate autonomously, these must additionally be provided, so that additional installation space is required, resulting in increased costs in terms of materials, installation and logistics.

SUMMARY OF THE INVENTION

It is accordingly an object of the invention to provide an improved resistance heater for a liquid system.

A further object of the invention is to provide a resistance heater which can operate autonomously.

Another object of the invention is to provide a resistance heater does not require a large installation space and which can be manufactured and installed at reasonable cost.

An additional object of the invention is to provide a method for detecting a liquid level in a liquid system.

A still further object of the invention is to provide an improved liquid system.

It is also an object of the invention to provide an improved method for detecting the temperature of a liquid in a liquid system.

These and other objects are achieved in accordance with a first aspect of the invention by providing a resistance heater for a liquid system comprising a pair of spaced contact rods; at least one heating element connected between the contact rods such that application of an electric voltage between the contact rods will cause an electric current to flow through the heating element; a sensor for sensing at least one parameter of a liquid in the liquid system; and an analyzer unit connected to the sensor for analyzing sensed values sensed by the sensor.

In accordance with another aspect of the invention, the objects are achieved by providing a liquid system comprising a housing having a liquid inlet and a liquid outlet, an adaptor disposed on the housing such that it sealingly closes an opening in the housing, and a resistance heater as described above mounted on the adaptor and extending into the housing such that the heater can contact a liquid present in the housing.

In a third aspect of the invention, the objects are achieved by providing a method for detecting a liquid level in a liquid system as described above comprising applying an electric voltage pulse between a liquid in the housing and the heating element; detecting a voltage characteristic of the applied pulse; transmitting the detected characteristic to the analyzer unit and analyzing the detected characteristic to determine the liquid level in the liquid system, and outputting a value representing the determined liquid level.

In yet another aspect of the invention, the objects are achieved by providing a method for detecting the temperature of a liquid in a liquid system as described above comprising detecting the temperature of a contact rod with the sensor; transmitting the detected temperature of the contact rod and the heating power of the resistance heater to the analyzer unit, and determining the temperature of the liquid in the analyzer unit as a function of the heating power of the heater and the temperature of the contact rod.

The resistance heater according to the present invention provides defined heating for a liquid contained in a liquid system, the liquid optionally being fuel, oil, water or any liquid mixture. The liquid can flow through the liquid system or it may be stored there. Other devices for treating the liquid may also be provided in the liquid system. These agents may include, for example, radiators or filters. The resistance heater has at least two contact rods having terminal contacts, so that an electric voltage can be applied to the contact rods via the terminal contacts. The contact rods are arranged with a distance between them and are connected by at least one heating element which is in contact with the contact rods. By applying an electric voltage to the terminal contacts, an electric current flows through the contact rods and the heating element, thereby heating it. The heat transfer to the liquid takes place through the heating elements. For example, all types of fuels, in particular diesel, oils, cooling liquids or cleaning liquids can be heated. To ensure proper functioning, the contact rods must have a good thermal conductivity and a high electric conductivity. The shape of the contact rods may be round, plate-shaped or profiled, e.g., designed in the form of a star or a polygon. Depending on the shape of the installation space for the resistance heater, any number of contact rods and heating elements may be provided, resulting in a uniform release of heat to the liquid over a large area. The resistance heater may be arranged so it is suspended, standing upright or lying sideways. The heating elements are made of an electric resistance material. A suitable material is then preferably a plastic material that conducts electricity and can be connected to the contact rods, e.g., in the injection molding process. The resistance material is a so-called heating conductor which, when a voltage is applied to it, has a low electric resistance and heats up due to the current flow. Because of its high thermal stability, a suitable plastic resistance material would be a polyamide [nylon] for example containing as additives, fillers, metal fibers, carbon fibers, carbon black particles, graphite particles, graphite powder or a combination of these fillers.

As another functional element, a sensor is integrated into the resistance heater, making it possible to detect at least one parameter of the liquid. Possible sensors include semiconductors for temperature measurement, piezoelectric sensors for pressure measurement, optoelectric sensors for density measurement, sensors for measuring capacitance and any other type of sensor known from the state of the art. The values detected by the sensors are received and processed by an analyzer unit. The data obtained in this way makes is possible to respond to changes in parameters and to activate actuators via control signals. For example, the resistance heater may be activated when the temperature falls below a setpoint temperature; a pump may be turned on when the pressure drops below a setpoint pressure; or a warning message may be issued when the density deviates from a setpoint density. The analyzer unit can relay control signals directly to the corresponding actuators or make the processed data available to another electronic unit. Essentially the sensors may also correspond to other analyzer units and the data obtained can provide information relevant to wear and maintenance in particular. The resistance heater of the invention makes it possible in an advantageous manner to integrate additional functions into a component and thereby utilize individual functional elements in multiple capacities, thereby reducing installation space, materials and manufacturing cost.

In accordance with one advantageous embodiment of the invention, the heating element has hydrophobic and/or oliophobic surface properties. These surface properties are created by a coating on the component. The material used for the coating is preferably formed by an inorganic nonmetallic base material, in particular a silicate base. The coating is designed to form a seal so that penetration of the fluid into the coating or adherence to the coating is prevented. Fluids may be liquid or gaseous media. The coating is preferably applied in an immersion bath, but it may also be sprayed onto the component. The coating is cured by the influence of temperature. To do so the surface may be heated, for example, by radiant heat or by thermal convection.

The pores present at the surface of the heating element advantageously are sealed by the coating. This coating is achieved with a minimal application of material, and therefore does not result in any adverse effect on the heat transfer between the heating element and the liquid. However, electrolytic decomposition of the heating element is prevented by the water repellant effect.

In an advantageous embodiment, the sensor is constructed as a temperature sensor. The temperature sensor is a heat-sensitive sensor which determines a temperature value based on the ambient temperature around it in conjunction with a corresponding analyzer unit. Commercial semiconductors which have a negative temperature coefficient (NTC) or a positive temperature coefficient (PTC) are available as sensors. They are usually formed by an iron-constantan element, an NiCr—Ni element or a Cu-constantan element. The temperature sensor is part of the resistance heater and can be arranged on the heating element. The temperature sensor thus detects the temperature of the heating element under known ambient conditions and thereby indirectly determines the temperature of the liquid. The temperature sensor may also be situated outside of the liquid system, at the terminal contacts of the heating element. Due to the temperature sensor being integrated into the resistance heater, the coordination of the regulation of the heating element to the liquid temperatures is advantageously facilitated.

In accordance with another advantageous embodiment, the temperature sensor is mounted directly on a contact rod. The temperature sensor is connected directly to the contact rod in a manner that is thermally conducting and therefore it detects the heat of the contact rod. To do so, the temperature sensor may be glued or soldered onto the contact rod, for example, or it may be cast or molded jointly with the contact rod. This thermally conducting connection may be positioned inside the liquid system or outside the system, e.g., on the analyzer unit. It should be noted here that no other heat-generating components should be positioned in the immediate vicinity of the temperature sensor or the temperature sensor should be shielded or thermally isolated from other heat sources. Due to the good thermal conductivity of the contact rod, a small portion of the heat of the heating element is transferred to the temperature sensor. With a constant heating power, constant thermal capacity of the liquid and constant volume flow, the temperature difference between the liquid and the contact rod changes approximately in proportion to the heating power. In the analyzer unit, the signal from the temperature sensor is associated with the heating power, so that the temperature of the liquid can be determined.

For determination of an activation and deactivation threshold of the heated element in a fuel heater system, minor fluctuations in the influencing parameters can be accepted, but if more precise measured values are required, the influencing parameters must be determined and taken into account by the analyzer unit. Due to the fact that the temperature of the liquid is detected by the contact rod, this yields the advantage of a space-saving configuration that is easy to install. As soon as the heating element has exceeded a critical temperature, e.g., in case of a fault, the analyzer unit can prompt a shutdown, thereby preventing overheating of the resistance heater.

According to another embodiment, a switching transistor is connected directly to one of the contact rods. The heat generated in the switching transistor must be dissipated. The thermally conducting connection between the switching transistor and the contact rod should be as direct as possible and over the largest possible area. The connection may be, for example, an adhesive connection, a soldered connection or a plug-in connection, and it is also possibly to integrally cast the switching transistor with the contact rod.

To prevent overheating of the heating element, e.g., when there is a defect in the transistor, a melting fuse which has a low melting point may be provided between the switching transistor and the contact rods. The melting point is below a thermal damage limit of the heating element and/or the ignition temperature of the liquid. The melting fuse interrupts the current flow if the temperature exceeds the melting point. The advantage lies in the benefit of the thermal conductivity of the contact rods over which the waste heat of the switching transistor is dissipated. Therefore, no additional temperature sensors need be provided for monitoring the transistor temperature, nor is any external heat sink necessary.

In an advantageous embodiment of this invention, the sensor is a filling level sensor which communicates with the analyzer unit. Under some circumstances, the sensor may be an additional sensor if the resistance heater already has a temperature sensor. The filling level sensor may, for example, detect a maximum or minimum value of a liquid level or the level of a liquid in a container. If two liquids having different densities are present in one container, then the liquid having the greater density will settle in the lower area of the container. The level may also be the horizontal dividing line between the liquids.

Suitable sensors include for example float sensors, where the float element floats in the liquid, at the height of the liquid level and thereby supplies signals to the analyzer unit via reed contacts or potentiometers. In addition, ultrasonic sensors may also detect the filling level. When the filling level measurement is integrated into the resistance heater, it is advantageous to combine several functions in one component. This makes it possible to reduce installation complexity, logistics complexity and the required installation space.

In accordance with another advantageous embodiment of this invention, the filling level sensor is a sensor based on the principle of measurement of capacitance. The liquid may consist of two different liquids, one liquid being electrically conducting and the other liquid, e.g., diesel fuel, having insulating properties. The principle of the capacitive measurement is based on the fact that a voltage potential is applied between two electrodes, with an electrically insulating layer provided between the electrodes. The electrically conducting liquid can form the first electrode, and the second electrode may be attached to the heating element, to a housing or attached via an adaptor, for example, or the housing itself. The electrically insulating layer serves as a dielectric, and the liquid applied to this surface serves as a capacitive opposite pole. To measure the capacitance, the electric voltage is applied as an alternating voltage or as a pulsed voltage. The charging current and discharging current are measured and analyzed by the analyzer unit. Because of the different electrical properties of the media in the liquid system, the liquid level can be determined by measuring the voltage characteristic. The voltage pulses are generated by the analyzer unit and can be directed to the liquid via an electrically conducting contact. This electric contact may be designed as a metallic pin or as a plate-shaped contact, for example. The electric properties of water in comparison with fuel, in particular diesel or air, differ sufficiently to determine a value for the filling level from the measured capacitance values. For example, a minimum or maximum height and any filling level in between may be determined.

Integration of the capacitive filling sensor into the resistance heating system offers the advantage that elements which are already present, such as an analyzer unit or an adaptor for mounting or electric contacting, may be utilized, thereby reducing the cost of materials, installation and logistics. At the same time, this yields more advantageous utilization of the installation space.

In another embodiment, the heating element is advantageously sheathed by an electrically insulating layer. The insulating layer may be made up of several layers of different materials. If the heating element is used as the second electrode and the liquid as the first electrode, then the insulating layer may form the dielectric necessary for measurement of the capacitance. The insulating layer may be formed of a non-conducting plastic, lacquer or any coating material known in the state of the art, which is resistant to the liquids and temperatures used. The coating may be applied by dipping, spraying or powder coating methods, for example. To prevent formation of deposits of substances, salts or dirt from the liquid surrounding the heating element, a coating of an inorganic nonmetallic base material, in particular a silicate base material may be applied.

The insulating layer advantageously protects the heating element from corrosion and from destruction by corrosive media and/or electrolysis. The dielectric formed around the heating element advantageously makes it possible to additionally utilize the electrode for measurement of capacitance. This has the advantage of avoiding the need for a separate capacitance area which also results in a considerable advantage in terms of material and space.

The liquid system of the invention can be provided for maintaining a supply of a liquid or for conducting a flow of the liquid through it. In one specific embodiment, the liquid system is a fuel filter system, especially a filter system for diesel fuel. The liquid system comprises a housing with an inlet and an outlet, whereby the liquid flows through the inlet into the liquid system and back through the outlet again and out of the liquid system. The housing may be, for example, a tank, a storage container, a filter housing or a separation container. A resistance heater like that described above is introduced into the liquid system. The resistance heater is arranged between the inlet and outlet. The resistance heater prevents, for example, paraffination in diesel fuel at winter temperatures. The water contained in diesel fuel settles at the bottom of the housing because of the difference in density. In such a case, it is necessary to monitor the level between the diesel fuel and the water.

An adaptor is provided on the housing for mechanically fastening and for providing electric contact with the resistance heater. The adaptor may be designed as a single one-piece or multi-piece component. The housing itself or a housing part, for example, may serve as the adaptor having recesses, ribs, protrusions, webs or bores for attaching the functional elements. The adaptor may be arranged inside or outside the housing wall or passing through it. At the same time, the adaptor may serve as a flange to seal the housing. It is advisable to arrange the adaptor between the heating element situated on the inside of the housing and the analyzer unit situated on the outside the housing. The electronic components of the analyzer unit therefore need not be encapsulated. The adaptor thus separates the inside of the housing from the outside of the housing, with the contact rods passing through the adaptor.

The interfaces of the functional elements of the liquid system are advantageously combined in the adaptor, so that all the sensors described here can be integrated and all the functions can be implemented with a minimum number of components, inexpensively, with favorable assembly and reliable function, and with favorable space requirements.

The present invention also relates to an advantageous method of monitoring a liquid level in a liquid system according to this invention. The detection of the liquid level may be triggered by an analyzer unit or by an electronic unit connected to the analyzer unit. The point in time of this detection may be determined, for example, by intervals of time, or after a defined operating period, or due to environmental conditions, or as a function of the outside temperature. The required steps are triggered by the analyzer unit according to a flow chart. First, the functional elements which prevent or interfere with a detection are deactivated. For example, if the heating element is in heating operation, it may not be used at the same time for detecting the liquid level or this may be allowed only with a high complexity in terms of the control technology. If the sensor is ready for operation, an electric voltage pulse is delivered to the liquid serving as the first electrode by a contact plate. The contact plate is preferably made of metal and is arranged at a point below the heating element. The heating element and/or the contact rod is used as a second electrode. The insulating layer between the electrodes serves as a dielectric so that an electric capacitance is formed between the electrodes. The analyzer unit detects the charging and discharging current occurring due to the voltage pulse and analyzes the values thus obtained. Because of the different properties of the liquids present in the housing, the data thus detected is related to the liquid level in the housing. The relationship to the liquid level can be determined, for example, by an algorithm or by comparison to reference values. For example, the capacitance of a housing filled 100% with water is approx. 2 nF and that of a housing filled 100% with fuel is less than 1 nF, so the compositions of mixtures exhibiting capacitance values in between these values are approximately proportional.

This method offers the advantage that the filling level measurement can be performed without separate filling level sensors and existing functional parts may be used for the filling level measurement. Therefore the installation space and assembly complexity are reduced, and the number of components is minimized. This makes it possible to implement a very inexpensive filling level measurement. Since no mechanical components are necessary, the reliability of the sensors is also increased.

The present invention also relates to an advantageous method of determining the liquid temperature inside the liquid system. There is a ratio between the temperature on the contact rods and the liquid temperature based on the thermal conductivity of the resistance heater and the contact rods. The temperature of a heating rod is detected by a temperature sensor and analyzed by the analyzer unit. The analyzer unit determines the liquid temperature and can take into account the heating power of the heating element, the volume flow of liquid and the thermal capacity of the liquid as influencing parameters. The liquid temperature is proportional to the temperature of the contact rod as a function of the heating power at a constant volume flow.

This method offers the advantage that the temperature of the contact rod and the liquid temperature can both be determined with one temperature sensor. Due to the simultaneous temperature monitoring of the contact pin, overheating of the heating system is prevented, e.g., when the housing is empty of liquid. This eliminates the need for an additional sensor which makes an inexpensive design feasible.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
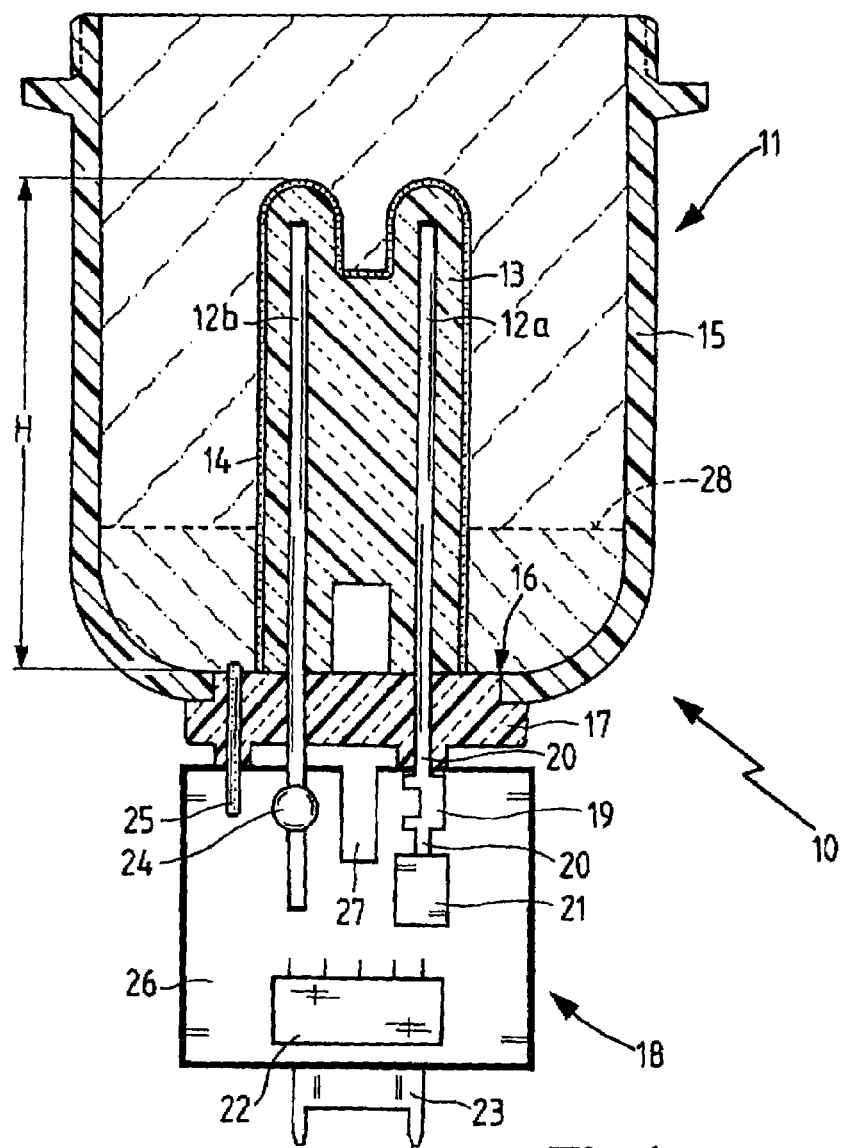
FIG. 1 is a schematic sectional view of a resistance heater according to the invention in a housing.

FIG. 1 shows a resistance heater 10 which is arranged on a housing 11. The housing 11 can be integrated into a fuel system via a flange (not shown). Resistance heater 10 has contact rods 12a and 12b, which are sheathed directly on their surfaces by a heating element 13. Contact rods 12a and 12b are made of a material which is a very good conductor of heat and electricity, in particular a metal such as copper.

The heating element 13 is arranged so it stands upright inside the housing 11 and extends over a height range H. The heating element 13 is formed by a material that conducts heat and electricity well, preferably a conductive synthetic resin (i.e. plastics) material. A plastic resistor material is especially suitable due to its properties. The plastic resistor material is made of a synthetic resin such as polyamide, polyphenylenesulfide or polypropylene using electrically conducting particles such as metals, carbon fibers, carbon black, graphite or a combination of these materials as fillers.

The type and amount of filler may be selected according to the electric resistance desired. The plastic essentially retains its specific gravity and strength and can be processed by methods conventionally used for plastics, such as injection molding. The surface of the heating element 13 is surrounded by a thin wall of electrically insulating layer 14.

The housing 11 has a housing wall 15 on which a housing opening 16 is provided in a deep area. The contact rods 12a and 12b pass through an adaptor 17 which is inserted into the housing opening 16 and closes the opening in a tightly sealed manner. The adaptor 17 is preferably made of a polymer which has thermal and electric insulation properties. To ensure the imperviousness of the housing opening 16, a resilient seal (not shown) may be arranged between the adaptor 17 and the housing wall 15. The seal may be attached axially and/or in the direction of assembly or also around the periphery, on the adaptor 17 and/or on the housing 11. An analyzer unit 18 is arranged beneath the adaptor 17. The contact rods 12a, 12b extend beneath the adaptor 17 into the analyzer unit 18 and are attached to it, for example, by soldered connections, by screw connections, or by plug-in connections.

A melting fuse 19 which serves as overheating protection is provided on the analyzer unit 18. The melting fuse 19 is connected to the contact rod 12a and a switching transistor 21 via connecting elements 20, thereby coupling it thermally to the resistance heater. The connecting elements 20 may be plug-in connections, solder joints or screw connections. The melting fuse 19 is made of an alloy with a low melting point. Depending on the current flow, overheating of the resistance heater is prevented by the melting fuse 19 by interrupting the current flow.

The switching transistor 21 which is also arranged on the analyzer unit 18 switches the heating element 13 on and off, controlled by a control pulse; this is known as pulse-width modulation (PWM). The switching transistor 21 is connected to the contact rod 12a. Due to this connection, heat generated in the switching transistor 21 can be dissipated into the heating element 13 via the contact rod 12a.

Another electronic component 22, which may be a microprocessor, for example, is provided on the analyzer unit 18 for detecting and processing all the values detected. An electric plug connector 23 forms a corresponding plug-in connection to an electronic unit, for example, and a power supply (not shown). A temperature sensor 24 is attached directly to the contact rod 12b with the largest possible surface contact, thereby ensuring a good heat transfer to the temperature sensor 24. The contact rod 12b is thermally connected to the temperature sensor 24, preferably by soldering. In other embodiments, the attachment may be undetachable, e.g., by adhesive bonding or riveting or detachable, e.g., by a plug-in connection or screw connection.

A contact plate 25 forms the electric contact surface with the liquid in the housing 11. Contact plate 25 is also connected to the analyzer unit 18. This makes it possible for an electric voltage pulse to be delivered by the analyzer unit 18 to the liquid and for the current and voltage characteristics to also be detected via the contact plate 25. The contact plate 25 may be attached in several positions and may be designed, e.g., in the form of a rod, a sheet metal strip or a cable. In the illustrative embodiment shown here, the contact plate 25 is located at the low point in the housing 11 and extends through the adaptor 17. However, the contact plate 25 may equally well be situated at a higher point and positioned separately in the housing 11.

The functional elements of the analyzer unit 18 described above are arranged directly or indirectly on a carrier body 26. For example a traditional plastic circuit board is a suitable carrier body 26 for the analyzer unit 18. The carrier body 26 has a recess or notch 27 which serves to provide thermal isolation and minimizes the transfer of heat emitted by the switching transistor 21 to the temperature sensor 24.

Inside the housing 11, there are two liquid media, each having a different density. The medium having the higher density is deposited in the lower area of the housing 11, and a phase boundary 28 is formed between the two media. In the case of a water separator for separating water from diesel fuel, the phase boundary 28 is detected by the analyzer unit 18. If the phase boundary 28 exceeds a defined limit value, then the accumulated water can be discharged from the housing 11 through a drain valve (not shown). The drain valve may also be situated in adaptor 17, for example, and triggered by the analyzer unit 18.

Figure 2:
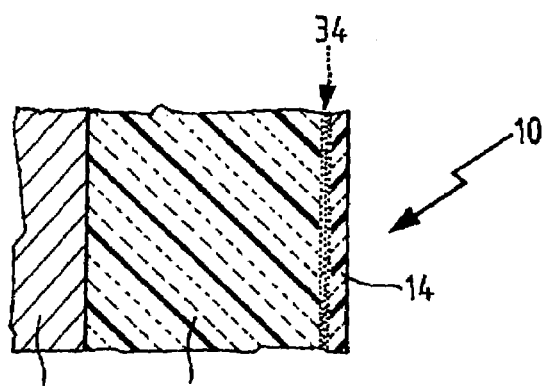
FIG. 2 is a detail view of the edge area of a heating element according to the invention.

FIG. 2 shows as a detail an edge area of the resistance heater 10. This edge area is situated inside the housing 11 shown in FIG. 1. The heated element 13 is connected to the contact rod 12 on one side and is coated with the insulating layer 14 on the other side. Between the insulating layer 14 and the heating element 13, a surface seal 34 made of a hardened inorganic nonmetallic coating solution, in particular based on silicate, is provided. This surface seal 34 seals the polymer surface and thus prevents liquids from penetrating through it.

Figure 3:
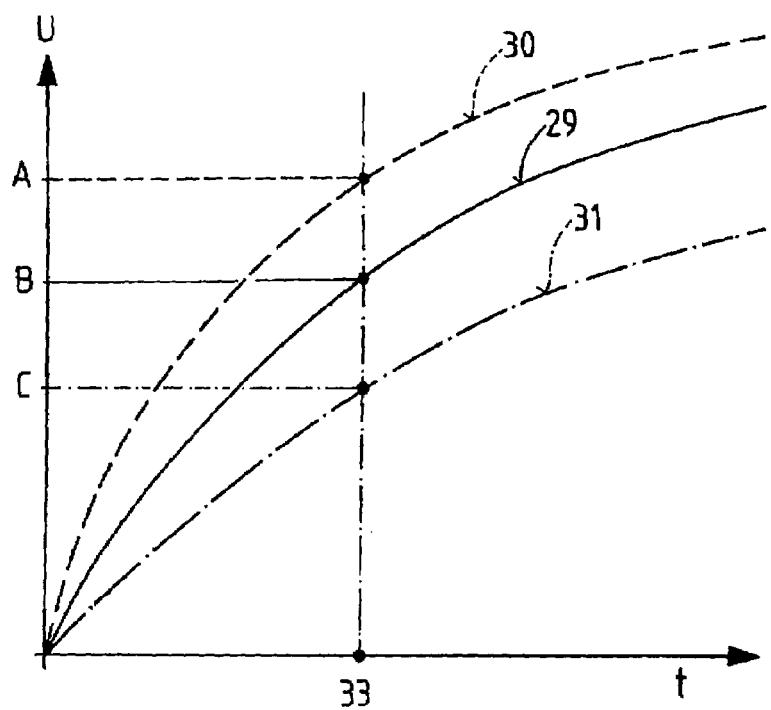
FIG. 3 is a voltage-time diagram illustrating the operation of the invention.

FIG. 3 shows the voltage characteristics of the filling level measurement at various liquid levels. The voltage characteristics are plotted on the voltage axis U as a function of the time axis t. The three curves 29, 30, 31 show the respective voltage characteristics for three different water levels of the liquid to be measured. In the voltage characteristics, the measurement is performed after the point in time 33. The values A, B and C detected at points in time 33 allow a conclusion as to the level of the liquid in the housing 11. If the amount of water in the housing 11 is high, the voltage characteristic curve 31 is shallow until the point in time 33 and yields the value C at the point in time 33. If there is no water in the housing 11, the voltage characteristic curve 30 climbs steeply until the point in time 33 yielding the value A. At a moderate water level, the voltage characteristic curve 29 is obtained with the value B.

Figure 4:
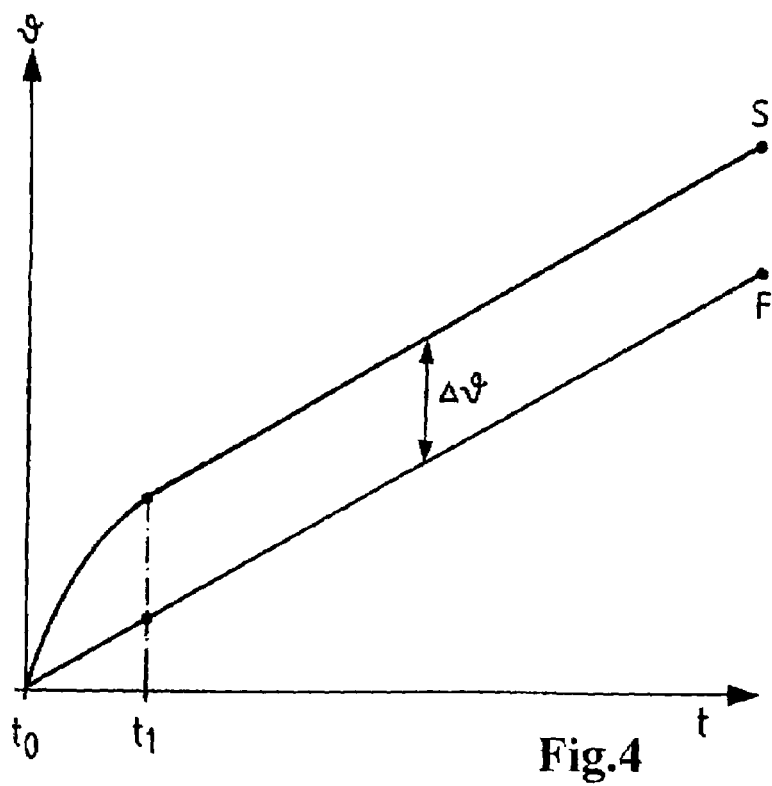
FIG. 4 is a temperature-time diagram illustrating the operation of the invention.

FIG. 4 shows a temperature difference $\Delta\theta$ between liquid temperature F inside the housing 11 (according to FIG. 1) and a sensor temperature S. This temperature difference $\Delta\theta$ occurs at a constant velocity of flow and constant heating power. The temperature $\theta$ is shown as a function of the time t. At an activation point in time t0, the sensor temperature S is equal to the liquid temperature F. Between the activation time of the heating element at the point in time t0 and a delay time t1, the liquid temperature F rises to the sensor temperature S with a time lag. After the point in time t1, a constant temperature difference $\Delta\theta$ is established between the sensor S and the liquid F. The sensor may also be situated outside the housing 11, which is also shown in FIG. 1, like the temperature sensor 24 shown in FIG. 1. The liquid temperature F can thus be calculated from the temperature value S detected at the sensor by subtracting the temperature difference $\Delta\theta$ from the sensor temperature S.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A resistance heater for a liquid system, said heater comprising:
    a pair of spaced contact rods;
    at least one heating element connected between the contact rods such that application of an electric voltage between the contact rods will cause an electric current to flow through the heating element;
    a filling level sensor that detects the capacitance of a liquid in said liquid system; and
    an analyzer unit connected to said sensor for analyzing sensed values sensed by said sensor.

2. A resistance heater according to claim 1, wherein the heating element is provided with a surface seal formed of an inorganic, non-metallic material.

3. A resistance heater according to claim 2, wherein said inorganic, non-metallic material is a silicate material.

4. A resistance heater according to claim 1, wherein the sensor further comprises a temperature sensor that detects the temperature of the liquid.

5. A resistance heater according to claim 4, wherein the temperature sensor is connected to one of the contact rods.

6. A resistance heater for a liquid system, said heater comprising:
    a pair of spaced contact rods;
    at least one heating element connected between the contact rods such that application of an electric voltage between the contact rods will cause an electric current to flow through the heating element;
    a sensor for sensing at least one parameter of a liquid in said liquid system;
    an analyzer unit connected to said sensor for analyzing sensed values sensed by said sensor; and
    a switching transistor for switching the heater on and off, wherein the switching transistor is connected thermally to one of the contact rods so heat from the switching transistor can be conducted away via the contact rod.

7. A resistance heater according to claim 1, wherein the heating element is sheathed by an electrically insulating layer.

8. A resistance heater according to claim 1, wherein said liquid system is a fuel system of a diesel engine.

9. A liquid system comprising a housing having a liquid inlet and a liquid outlet, an adaptor disposed on said housing such that it sealingly closes an opening in said housing, and a resistance heater according to claim 1 mounted on said adaptor and extending into said housing such that the heater can contact a liquid present in said housing.

10. A liquid system according to claim 9, wherein said liquid system is a part of a fuel system of a diesel engine.

11. A liquid system according to claim 10, wherein said liquid system is a diesel fuel filter.

* * * * *